United States Patent
Baumgaertner

(10) Patent No.: US 11,086,666 B2
(45) Date of Patent: Aug. 10, 2021

(54) ACTIVATING TASKS IN AN OPERATING SYSTEM USING ACTIVATION SCHEMATA

(71) Applicant: Robert Bosch GmbH, Stuttgart (DE)

(72) Inventor: Rainer Baumgaertner, Pfaffenhofen (DE)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 16/401,721

(22) Filed: May 2, 2019

(65) Prior Publication Data

US 2019/0347130 A1 Nov. 14, 2019

(30) Foreign Application Priority Data

May 8, 2018 (DE) .......................... 102018207175.6

(51) Int. Cl.
 *G06F 9/48* (2006.01)
 *G06F 9/38* (2018.01)
 *G06F 9/54* (2006.01)
 *G06F 9/50* (2006.01)

(52) U.S. Cl.
 CPC .......... *G06F 9/4881* (2013.01); *G06F 9/3877* (2013.01); *G06F 9/5061* (2013.01); *G06F 9/541* (2013.01)

(58) Field of Classification Search
 CPC ...... G06F 9/4881; G06F 9/5061; G06F 9/542; G06F 9/4843
 See application file for complete search history.

(56) References Cited

U.S. PATENT DOCUMENTS

| | | | | |
|---|---|---|---|---|
| 6,260,058 B1* | 7/2001 | Hoenninger | .......... | G06F 9/4887 718/103 |
| 8,087,019 B1* | 12/2011 | Sobotka | .............. | G06F 16/9535 718/100 |
| 2007/0038704 A1* | 2/2007 | Brown | .................. | H04L 63/102 709/206 |
| 2011/0131448 A1* | 6/2011 | Vasil | ..................... | G06F 9/5038 714/19 |
| 2013/0247051 A1* | 9/2013 | Sun | ...................... | G06Q 10/067 718/102 |
| 2015/0202969 A1* | 7/2015 | Terayama | ............... | G06F 9/542 700/275 |
| 2016/0147955 A1* | 5/2016 | Shah | ..................... | G16H 40/20 705/3 |
| 2016/0203024 A1* | 7/2016 | Choi | ..................... | G06F 9/5027 718/1 |
| 2016/0210316 A1* | 7/2016 | Bendel | ................. | G06F 16/219 |
| 2018/0150529 A1* | 5/2018 | McPherson | ............ | G06F 9/542 |
| 2018/0173774 A1* | 6/2018 | McPherson | ........... | G06F 16/254 |
| 2020/0089528 A1* | 3/2020 | Gutierrez | ............. | G06F 9/4843 |

FOREIGN PATENT DOCUMENTS

WO 2016023767 A1 2/2016

* cited by examiner

*Primary Examiner* — Benjamin C Wu
(74) *Attorney, Agent, or Firm* — Norton Rose Fulbright US LLP; Gerard Messina

(57) ABSTRACT

A method is described for activating tasks in an operating system, characterized by the following features: the tasks are respectively assigned to one of multiple activation schemata; triggering events are assigned to the activation schemata; and if a triggering event occurs, which is assigned to one activation schema among the activation schemata, then the tasks assigned to the activation schema are activated in accordance with the activation schema.

7 Claims, 2 Drawing Sheets

ACTIVATING TASKS IN AN OPERATING SYSTEM USING ACTIVATION SCHEMATA

FIELD OF THE INVENTION

The present invention relates to a method for activating tasks in an operating system. The present invention also relates to a corresponding device, a corresponding computer program as well as a corresponding storage medium.

BACKGROUND INFORMATION

In computer science, a cyber-physical system (CPS) is any combination of components of information and software technology and mechanical or electronic components that communicate via a data infrastructure such as a field bus or another kind of computer network. The formation of cyber-physical systems results from networking embedded systems by wire-bound or wireless communication networks. Cyber-physical systems according to the related art are characterized by a high degree of complexity.

Typical fields of application of CPS include highly reliable medical devices and systems, age-based assistance systems, IT traffic control and traffic logistics systems, networked safety and driver assistance systems for motor vehicles, industrial process control and automation systems, sustainable environmental impact and observation systems, energy supply management systems, military system networking systems and infrastructure systems for communication and culture.

WO2016023767A1 for example discloses a driver assistance system for a vehicle, which is designed to take over the operation of the vehicle by partial automation and cooperation with the driver. The driver assistance system in this instance comprises at least one operating element, which the driver must operate when specific driving situations occur, which ensures the vigilance and attentiveness of the driver while a partially automated drive is performed. Depending on the operation of the operating element, the currently performed partially automated driving maneuver or the partially automated drive and a partially automated driving maneuver performed during or after the operation of the operating element is continued, is adapted in its execution or is ended.

SUMMARY

The present invention provides a method for activating tasks in an operating system, a corresponding device, a corresponding computer program as well as a corresponding storage medium.

The provided approach is based on the recognition that driver assistance systems for highly automated driving are currently in a formative phase. The complexity of this kind of software is higher by orders of magnitude than that of today's automotive systems.

The method provided below is further based on the insight that systems for highly automated driving are technically elaborate. The same is true of future robotics systems. They require high computing power and a large memory and must fulfill high safety requirements. Taking the functional safety requirements into account additionally increases system complexity.

Today's systems in the automotive field are often designed as directly communicating applications or components. Data are immediately provided to other applications at the time of availability. For technical reasons, it is not possible to specify exactly the precise time interrelationship of the individual applications, e.g. because much fewer independent processor cores are available than applications that are to be executed on them. It is therefore difficult to predict when data will be transmitted exactly. From the perspective of the receiving applications, this results in an unpredictable data age that depends on the actual execution time.

A proposal for solving this problem provides for the outputs of all applications or components of a time slice or task to be made visible only at the beginning of the next time slice and for the inputs of all applications or components within a time slice or task to be quasi frozen at the beginning of the task.

The determinism that is thereby achievable decisively facilitates the development since now, in the case of given input data, the output data and their receivers are clearly defined—even in the context of a complex time slice system.

In addition to the simplified development, this also allows for a final definite resimulation. In the process, it is possible to implement any task structures, the consistency of the data being always ensured.

The approach described below furthermore takes into account the fact that for the purpose of resimulation and for reducing the timing complexity it is expedient to assemble, based on the above-described mechanism, a task system made of multiple tasks that are based on a common activation schema.

One advantage of the approach of the present invention is that it makes it possible to use external events as a basis of the activation. In spite of the common activation schema, this is possible while maintaining the resimulation capability and reducing the timing complexity in accordance with the method presented below.

A basic idea of this approach is the use of multiple activation schemata. This makes it possible to synchronize respectively one activation schema to one event source or to perform the activation in response to it—and to do so independently and individually for all utilized activation schemata. Event sources may be for example the reception of data (via buses, Ethernet, CAN, Flexray, LVDS, etc.), hardware or software signals.

Within an activation schema, the determinism and hence in particular the capability of resimulation are thus preserved. Nevertheless, by using multiple activation schemata, it is possible to synchronize flexibly to different events.

There may be a provision to assign separate partitions to the individual activation schemata. For one skilled in the art, a partition is a separation option provided by the operating system or the infrastructure (e.g. a so-called hypervisor). The mutual freedom from interference of the individual partitions with respect to the dynamic (runtime protection) or static (memory protection) influences is ensured in the process. The use of static partitions is particularly advantageous in this regard. Here, the partition is implemented by the bijective assignment of physical processing units. This increases the dynamic separation.

The unique assignment of the individual activation schemata to partitions results in sharply separated activation schemata, which are maximally independent with respect to their dynamic and static behavior. This additionally increases the determinism.

Once specific embodiment of the present invention allows e.g. for the integration of software components of different relevance for operational reliability (criticality). It may be furthermore advantageous to pursue this approach independently of the synchronization to event sources. In a corresponding development, it is possible to use multiple activation schemata synchronously with respect to one another. This allows for an interconnection, capable of resimulation, of activation schemata that are separated for the benefit of operational safety.

All in all, e.g. for a given hardware, this results in an solution for fulfilling the safety requirements and for reducing the development expenditure or increasing the efficiency in the reproduction of states.

DETAILED DESCRIPTION

Figure 1:
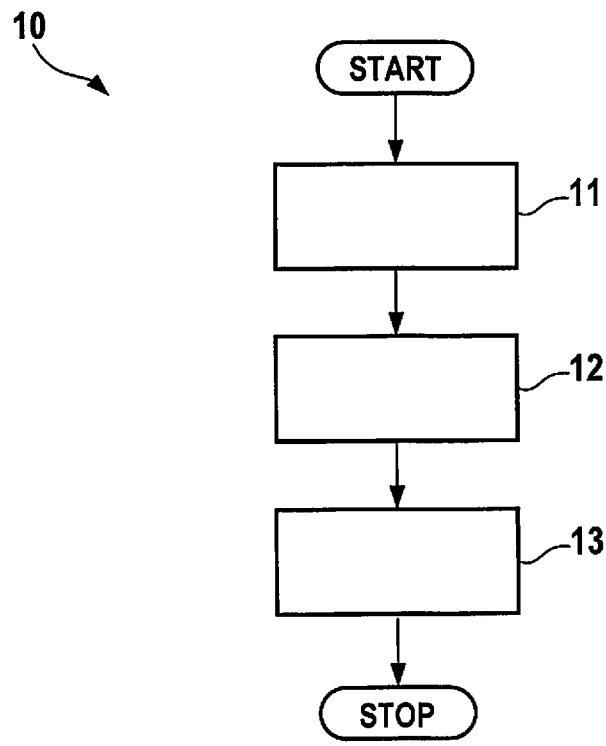
FIG. 1 shows a flow chart of a method according to a first specific embodiment.

FIG. 1 illustrates the basic sequence of the method (10) according to the present invention. The tasks to be performed are accordingly assigned to one of several activation schemata (process 11), which in turn have triggering events assigned to them (process 12). As soon as one of these events occurs, the tasks assigned to the respective activation schema are activated in accordance with the activation schema (process 13).

Figure 2:
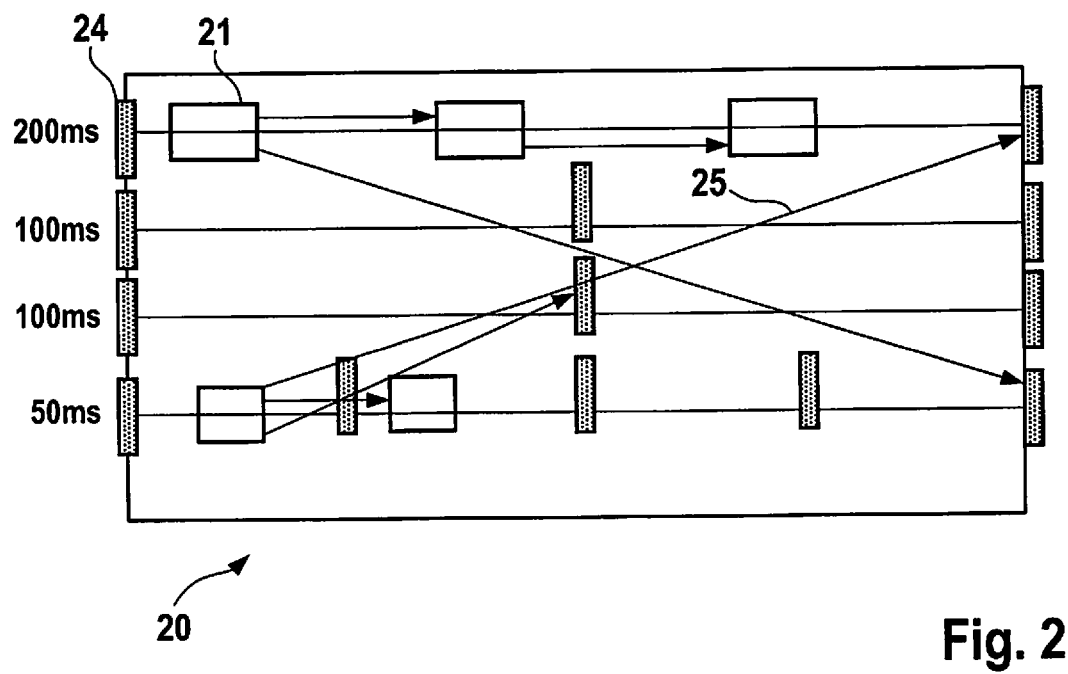
FIG. 2 shows a deterministic activation and communication.

By way of example, FIG. 2 shows a system that is made up of applications or components that are organized within time slices and tasks (21). The applications or components output data and are able to receive data. The data output is shown on the right side of the respective component, the data input—the input data are "frozen" (24), as it were, when activating a task (21)—is shown on its left side. Time advances from left to right according to the illustration.

Figure 3:
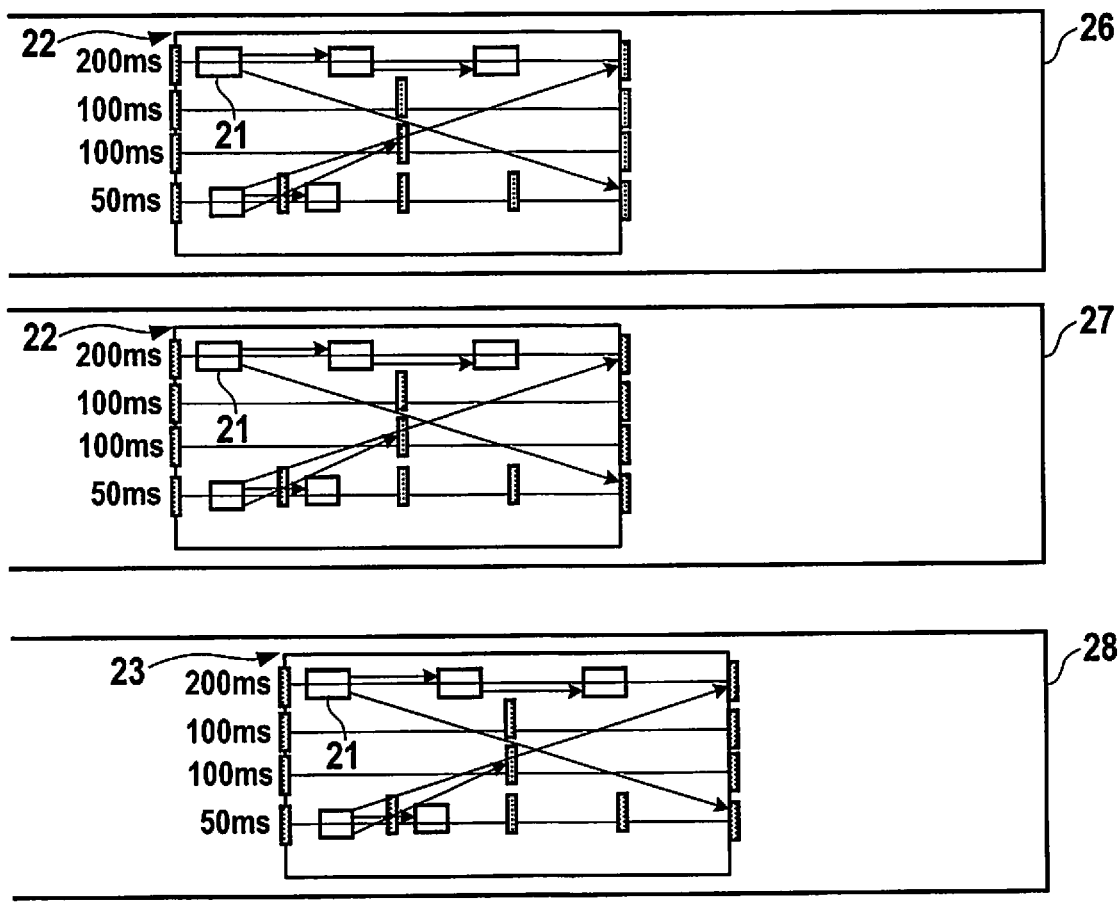
FIG. 3 shows the use of multiple activation schemata.

FIG. 3 illustrates the use of multiple activation schemata. This makes it possible to synchronize respectively one activation schema to one event source or to activate it in response. It is also possible to trigger several activation schemata synchronously, for example using a suitable timer. Thus a period duration of 200 ms could be considered for example for the shown partitions 26, 27. An individual triggering 23 may be seen in the case of the lowest partition 28 according to the illustration.

The described bijective assignment of partitions (26, 27, 28) to activation schemata extends the spectrum of application by the possibility of a deterministic integration of activation schemata of varying safety relevance. For example, a partition (26, 27, 28) of the automotive safety integrity level, ASIL) could correspond to ASIL-D, a second partition (26, 27, 28) to ASIL-C and a third partition (26, 27, 28) again to ASIL-D.

Figure 4:
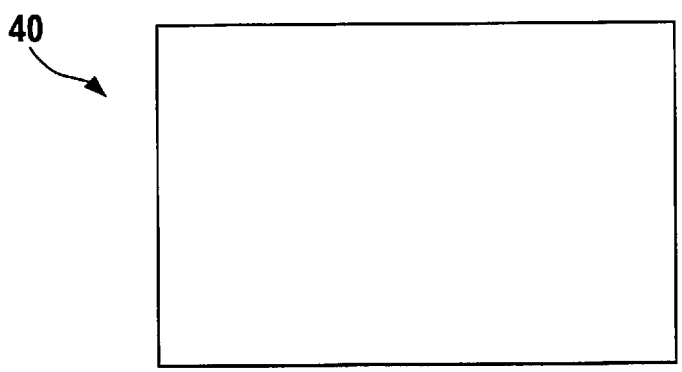
FIG. 4 shows a control unit according to a second specific embodiment in a schematic representation.

This method (10) may be implemented for example in software or hardware or in a mixed form of software and hardware for example in a control unit (40), as the schematic representation of FIG. 4 illustrates.

What is claimed is:

1. A method for activating tasks in an operating system that manages a plurality of virtual machines that are each assigned a respective one of multiple activation schemata, the method comprising:

assigning the tasks respectively to one of the multiple activation schemata so that each of one or more of the activation schemata is assigned multiple ones of the tasks;

assigning triggering events to the activation schemata;

in response to an occurrence of one of the triggering events that is assigned to one of the activation schemata, activating all of the tasks assigned to the respective activation schema to which the occurrence of the one of the triggering events is assigned in accordance with the activation schema; and synchronizing operation by the plurality of the virtual machines with each other by synchronizing occurrences of the respective triggering events respectively assigned to the activation schemata of the plurality of virtual machines, wherein the synchronizing of the occurrences of the respective triggering events includes delaying inputs corresponding to the triggering events according to defined time slices that are applied to all of the activation schemata.

2. The method as recited in claim 1, wherein at least one of:

the method further comprises signaling an occurrence of at least one of the triggering events by one of a hardware signal and a software signal, and the triggering events include a reception of data.

3. The method as recited in claim 1, wherein the virtual machines are assigned statically to one of multiple processing units.

4. The method as recited in claim 3, wherein the virtual machines have different security levels.

5. The method as recited in claim 1, wherein the activation schemata define a data flow between the tasks.

6. A non-transitory machine-readable storage medium on which is stored a computer program for executing on a processing device a method for activating tasks in an operating system that manages a plurality of virtual machines that are each assigned a respective one of multiple activation schemata, the method comprising:

assigning the tasks respectively to one of the multiple activation schemata so that each of one or more of the activation schemata is assigned multiple ones of the tasks;

assigning triggering events to the activation schemata;

in response to an occurrence of one of the triggering events that is assigned to one of the activation schemata, activating all of the tasks assigned to the respective activation schema to which the occurrence of the one of the triggering events is assigned in accordance with the activation schema; and synchronizing operation by the plurality of the virtual machines with each other by synchronizing occurrences of the respective triggering events respectively assigned to the activation schemata of the plurality of virtual machines, wherein the synchronizing of the occurrences of the respective triggering events includes delaying inputs corresponding to the triggering events according to defined time slices that are applied to all of the activation schemata.

7. A device for activating tasks in an operating system that manages a plurality of virtual machines that are each assigned a respective one of multiple activation schemata, the device comprising a processor configured to:

control performance of activating tasks in the operating system using multiple activation schemata, wherein:

the tasks are respectively assigned to one of the multiple activation schemata so that each of one or more of the activation schemata is assigned multiple ones of the tasks;

triggering events are assigned to the activation schemata; and the control by the processor includes, in response to an occurrence of one of the triggering events that is assigned to one of the activation schemata, activating all of the tasks assigned to the respective activation schema to which the occurrence of the one of the triggering events is assigned in accordance with the activation schema; and synchronize operation by the plurality of the virtual machines with each other by synchronizing occurrences of the respective triggering events respectively assigned to the activation schemata of the plurality of virtual machines, wherein the synchronization of the occurrences of the respective triggering events includes delaying inputs corresponding to the triggering events according to defined time slices that are applied to all of the activation schemata.

* * * * *